UNITED STATES PATENT OFFICE.

GEORGE J. HENNINGER, OF ALLENTOWN, PENNSYLVANIA.

COMPOUND FOR COOLING AND LUBRICATING JOURNALS.

SPECIFICATION forming part of Letters Patent No. 288,054, dated November 6, 1883.

Application filed November 20, 1882. (No specimens.)

*To all whom it may concern:*

Be it known that I, GEORGE JACOB HENNINGER, of Allentown, Pennsylvania, have invented a new and useful Improvement in Compounds for Cooling and Lubricating Journal-Boxes, of which the following is a description.

My improved compound consists in the combination of the carbonates of soda and ammonia with any of the fatty animal or vegetable substances—such as oils, tallows, suets—which may be used for lubricating purposes. The proportions of these salts to the oils or fats may vary; but my discovery does not depend upon the exact proportions of these salts so used, but in the combination of them with the lubricating substance. The object of using and combining these salts with the oils is not only to lubricate the journal, but to put out any fire that may exist and to quickly cool off the heated journal, even while in motion. That my compound will do this has already been clearly demonstrated by repeated tests. A convenient way of preparing a suitable lubricating compound in which these salts are combined is as follows: Dissolve five pounds of carbonate of soda in about a gallon of water, using just enough and no more water than will dissolve the soda. In another dish or vessel dissolve one pound of pulverized carbonate of ammonia. About two quarts of water will be sufficient. Then mix both solutions of soda and ammonia together, and gradually add five gallons of the lubricating oil or substance, stirring slowly and thoroughly. Put the mixture in an air-tight can and let it stand not less than forty-eight hours, by which time the ammonia and soda will have united with the oil, and the water, or a portion of it, will have settled to the bottom, and may be drawn off by a faucet. The compound is now ready for use; but in using it ought to be kept in covered cans, so as to exclude the air and prevent the evaporation of the ammonia.

I am aware that carbonate of soda and carbonate of ammonia have been used in connection with animal and vegetable oils and other lubricants to form lubricating compounds; but they have been mixed with other ingredients and in different proportions from my compound, and the result has been that they are lubricants only, and do not serve to cool journals already hot, the carbonate of ammonia being used in such small proportional quantity as to prevent its having the effect I produce with my compound; and the combining of the soda, ammonia, and lubricant, and the treatment of these in the manufacture of my compound is, I believe, new with myself, and produces a new compound which not only lubricates and prevents heating of a cold journal or bearing, but will cool a hot bearing while in motion. None of the other compounds with which I am acquainted pretend to do this.

What I claim, and desire to secure by Letters Patent, is—

1. The lubricating compound herein described, composed of the carbonate of soda, carbonate of ammonia, and a lubricating oil or substance, substantially as and in the proportions described.

2. The cooling and lubricating compound herein described, composed of the proportional parts of the carbonates of ammonia and soda, dissolved in water and then mixed with a lubricant oil, substantially as and in the proportions named.

3. A cooling and lubricating compound composed of any suitable animal or vegetable oil or fat, combined with the carbonates of ammonia and soda in proper proportions.

In witness whereof I have hereunto set my hand this 6th day of November, 1882.

GEORGE J. HENNINGER.

Witnesses:
C. P. JACOBS,
C. S. SPRITZ.